United States Patent
Wang et al.

(10) Patent No.: US 9,999,939 B2
(45) Date of Patent: Jun. 19, 2018

(54) RESISTANCE SPOT WELDING STEEL AND ALUMINUM WORKPIECES WITH ELECTRODE INSERT

(71) Applicant: GM GLOBAL TECHNOLOGY OPERATIONS LLC, Detroit, MI (US)

(72) Inventors: Pei-Chung Wang, Troy, MI (US); David R. Sigler, Shelby Township, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 564 days.

(21) Appl. No.: 14/561,746

(22) Filed: Dec. 5, 2014

(65) Prior Publication Data
US 2016/0158874 A1    Jun. 9, 2016

(51) Int. Cl.
*B23K 11/10*    (2006.01)
*B23K 11/20*    (2006.01)
*B23K 11/11*    (2006.01)
*B23K 11/30*    (2006.01)
*B23K 103/20*    (2006.01)

(52) U.S. Cl.
CPC .............. *B23K 11/20* (2013.01); *B23K 11/115* (2013.01); *B23K 11/3009* (2013.01); *B23K 2203/20* (2013.01)

(58) Field of Classification Search
CPC ....... B23K 11/115; B23K 11/20; B23K 11/36; B23K 2203/10; B23K 2203/04; B23K 2203/05
USPC .................... 219/91.2, 92, 94, 118
See application file for complete search history.

(56) References Cited

U.S. PATENT DOCUMENTS

| | | | |
|---|---|---|---|
| 7,850,059 B2 | 12/2010 | Kobayashi et al. | |
| 7,935,908 B2 | 5/2011 | Nakagawa et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |

(Continued)

FOREIGN PATENT DOCUMENTS

JP     11342477     12/1999

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.

(Continued)

*Primary Examiner* — Phuong Nguyen
(74) *Attorney, Agent, or Firm* — Reising Ethington P.C.

(57) ABSTRACT

A method of resistance spot welding a steel workpiece and an aluminum or aluminum alloy workpiece together includes several steps. In one step a workpiece stack-up is provided. The workpiece stack-up includes a steel workpiece and an aluminum or aluminum alloy workpiece. Another step involves providing a first welding electrode that confronts the aluminum workpiece, and providing a second welding electrode that confronts the steel workpiece. The first welding electrode has an electrode body and an insert that functions to limit or eliminate heat flux into the electrode body. Other steps of the method involve bringing the first and second welding electrodes into contact with opposite sides of the workpiece stack-up and resistance spot welding the stack-up.

20 Claims, 2 Drawing Sheets

(56) References Cited

U.S. PATENT DOCUMENTS

| | | | |
|---|---|---|---|
| 8,487,206 | B2 | 7/2013 | Urushihara et al. |
| 2008/0073612 | A1* | 3/2008 | Day .................... F16J 15/061 251/306 |
| 2009/0065484 | A1* | 3/2009 | Wang ................ B23K 11/115 219/118 |
| 2013/0189023 | A1* | 7/2013 | Spinella ............. B23K 11/0026 403/270 |
| 2013/0309520 | A1* | 11/2013 | Lang ...................... F16B 5/10 428/594 |
| 2014/0360986 | A1 | 12/2014 | Sigler et al. |
| 2015/0053654 | A1 | 2/2015 | Sigler et al. |
| 2015/0053655 | A1 | 2/2015 | Sigler et al. |
| 2015/0083693 | A1 | 3/2015 | Schroth et al. |
| 2015/0096961 | A1 | 4/2015 | Carlson et al. |
| 2015/0096962 | A1 | 4/2015 | Sigler et al. |
| 2015/0231729 | A1 | 8/2015 | Yang et al. |
| 2015/0231730 | A1 | 8/2015 | Yang et al. |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Sigler et al., U.S. Appl. No. 14/673,106, entitled "Conical Shaped Current Flow to Facilitate Dissimilar Metal Spot Welding," filed Mar. 30, 2015.

Sigler et al., U.S. Appl. No. 14/722,563 entitled "Resistance Spot Welding Workpiece Stack-Ups of Different Combinations of Steel Workpieces and Aluminum Workpieces," filed May 27, 2015.

Sigler et al., U.S. Appl. No. 14/724,070, entitled "Cover Plate with Intruding Feature to Improve Al-Steel Spot Welding," filed May 28, 2015.

Yang et al., U.S. Appl. No. 14/729,693 entitled "Intruding Feature in Aluminum Alloy Workpiece to Improve Al-Steel Spot Welding," filed Jun. 3, 2015.

Yang et al., U.S. Appl. No. 14/729,656 entitled "Cooling to Control Thermal Stress and Solidification for Welding of Dissimilar Materials," filed Jul. 7, 2015.

* cited by examiner

RESISTANCE SPOT WELDING STEEL AND ALUMINUM WORKPIECES WITH ELECTRODE INSERT

TECHNICAL FIELD

The technical field of this disclosure relates generally to resistance spot welding and, more particularly, to resistance spot welding a steel workpiece and an aluminum or aluminum alloy workpiece.

BACKGROUND

Resistance spot welding is a process used in a number of industries to join together two or more metal workpieces. The automotive industry, for instance, often uses resistance spot welding to join together metal workpieces during the manufacture of a vehicle door, hood, trunk lid, or lift gate, among other vehicle components. Multiple resistance spot welds are typically made along a periphery of the metal workpieces or at some other location. While spot welding has typically been performed to join together certain similarly-composed metal layers—such as steel-to-steel and aluminum alloy-to-aluminum alloy—the desire to incorporate lighter weight materials into a vehicle platform has created interest in joining steel workpieces to aluminum or aluminum alloy (hereafter collectively "aluminum" for brevity) workpieces by resistance spot welding. Moreover, the ability to resistance spot weld workpiece stack-ups containing different workpiece combinations (e.g., aluminum/aluminum, steel/steel, and aluminum/steel) with one piece of equipment would increase production flexibility and reduce manufacturing costs.

Resistance spot welding, in general, relies on the resistance to the flow of electric current through contacting metal workpieces and across their faying interface to generate heat. To carry out a resistance welding process, a pair of opposed welding electrodes is clamped at aligned spots on opposite sides of the metal workpieces at a weld site. An electrical current is then passed through the workpieces from one welding electrode to the other. Resistance to the flow of the electric current generates heat within the metal workpieces and at their faying interface. When the workpieces being spot welded are a steel workpiece and an aluminum workpiece, the heat generated at the faying interface typically initiates a molten weld pool that penetrates into the aluminum workpieces from the faying interface. The molten weld pool wets the adjacent surface of the steel workpiece and, upon cessation of the current flow, solidifies into a weld nugget that forms all or part of a weld joint. After the spot welding process is completed, the welding electrodes are retracted from the workpiece surfaces and the spot welding process is repeated at another weld site.

Resistance spot welding a steel and an aluminum workpiece, however, can be challenging since the two metals possess different properties that tend to complicate the welding process. Specifically, steel has a relatively high melting point (~1500° C.) and relatively high electrical and thermal resistivities, while aluminum has a relatively low melting point (~600° C.) and relatively low electrical and thermal resistivities. As a result, most of the heat is generated in the steel workpiece during electrical current flow. This heat imbalance sets up a temperature gradient between the steel workpiece (higher temperature) and the aluminum workpiece (lower temperature) that initiates rapid melting of the aluminum workpiece. The combination of the temperature gradient created during current flow and the high thermal conductivity of the aluminum workpiece means that, immediately after the electrical current has ceased, a situation occurs where heat is not disseminated symmetrically from the weld site. Instead, heat is conducted from the hotter steel workpiece through the aluminum workpiece towards the welding electrode in contact with the aluminum workpiece, creating relatively steep thermal gradients in that direction.

The development of steep thermal gradients between the steel workpiece and the welding electrode in contact with the aluminum workpiece is believed to weaken the integrity of the resultant weld joint in two primary ways. First, because the steel workpiece retains heat for a longer duration than the aluminum workpiece after the electrical current has ceased, the molten weld pool that has been initiated and grown in the aluminum workpiece solidifies directionally, starting from the region nearest the colder welding electrode (often water cooled) associated with the aluminum workpiece and propagating towards the faying interface. A solidification front of this kind tends to sweep or drive defects—such as gas porosity, shrinkage voids, micro-cracking, and oxide residue—towards and along the faying interface within the aluminum weld nugget. Second, a sustained elevated temperature in the steel workpiece promotes the growth of brittle Fe—Al intermetallic compounds at and along the faying interface. The intermetallic compounds tend to form thin reaction layers between the aluminum weld nugget and the steel workpiece. If present, these intermetallic layers are generally considered part of the weld joint along with the weld nugget. Having a dispersion of weld nugget defects together with excessive growth of Fe—Al intermetallic compounds along the faying interface is thought to reduce the peel strength of the final weld joint.

SUMMARY OF THE DISCLOSURE

A method of resistance spot welding a workpiece stack-up that includes a steel workpiece and an aluminum or aluminum alloy workpiece (again, collectively referred to in this disclosure as "aluminum" for brevity) workpiece is disclosed. The method involves the use of an insert embedded within a body of the welding electrode that is exposed at the electrode weld face such that the insert makes contact with the aluminum workpiece during resistance spot welding. The insert functions to limit or eliminate heat flux into the electrode body. It does this by having at least a peripheral portion adjacent to the surrounding electrode body that exhibits an electrical conductivity that is less than or equal to approximately 20% of the electrical conductivity of commercially pure annealed copper as defined by the International Annealed Copper Standard (IACS) as well as a thermal conductivity that is less than or equal to approximately 20% of the thermal conductivity of commercially pure annealed copper.

The insert can have a variety of constructions that satisfy the electrical and thermal conductivity parameters noted above. For example, in one embodiment, the insert can be entirely composed of low electrical/thermal conductivity materials (i.e., electrical and thermal conductivity each less than 20% of the electrical and thermal conductivity of commercially pure annealed copper, respectively) such as low carbon steels, tool steel, stainless steels, cupronickel metals, Hastelloy® metals, Inconel® metals, titanium, as well as other metals. As another example, the insert can be an electric insulator that lacks the ability to conduct electric current. Examples of electric insulator materials include alumina, fused silica, cordierite, and certain low and high voltage porcelains. Still further, the insert can include an insulating or a low electrical/thermal conductivity casing and an interior piece within the casing that may have electrical and thermal conductivities well in excess of 20% of that of commercially pure annealed copper, but does not necessarily have to. The interior piece can have relatively high electrical and thermal conductivities because, ultimately, the casing functions as a barrier that appreciably minimizes or eliminates heat flux into the surrounding electrode body from the insert. In one particular embodiment, the casing can be composed of a material such as Teflon® (PTFE) or a high-temperature epoxy adhesive, and the interior piece can be composed of a refractory metal such as molybdenum, a molybdenum alloy, tungsten, or a tungsten alloy.

The insert alters the temperature gradients around the molten aluminum weld pool in at least one of two ways due to its lower electrical and thermal conductivities relative to the surrounding electrode body in which it is embedded. First, any heat contained in the insert—either generated by resistive heating or by way of conduction from the molten aluminum weld pool, or both—is not easily transmitted to the surrounding electrode body. The insert thus retains heat within the aluminum workpiece underneath and in contact with the insert that would otherwise not be present absent the insert. Second, the high electrical resistivity of the peripheral portion of the insert causes the electrical current being passed between the welding electrodes to assume a conical flow pattern within the aluminum workpiece and around the insert. These two effects, either individually or in concert, can change the temperature gradients around the molten aluminum weld pool in a beneficial way. In particular, it is believed that the altered temperature gradients change the solidification behavior of the molten aluminum weld pool to preclude the unwanted accumulation of defects at and along a faying interface of the workpiece stack-up. Furthermore, if the insert generates sufficient heat, then the heat that needs to be generated in the steel workpiece can be reduced which, consequently, inhibits the growth of brittle Fe—Al intermetallic layer(s) at the faying interface.

DETAILED DESCRIPTION

The methods and assemblies detailed in this description resolve several challenges encountered when resistance spot welding a workpiece stack-up that includes an aluminum workpiece and a steel workpiece. Though described in more detail below, in general the methods and assemblies described can alter the solidification behavior of the molten aluminum weld pool created within the aluminum workpiece in order to limit or altogether preclude the accumulation and dissemination of defects at the faying interface between the steel and aluminum workpieces. The methods and assemblies can also minimize the size and thickness of any Fe—Al intermetallic layers formed at the faying interface. Taken together or alone, these measures help ensure adequate strength, in particular adequate peel strength, of a weld joint established between the aluminum and steel workpieces. And while the methods and assemblies are described below in the context of vehicle body parts, skilled artisans will know and understand that such methods and assemblies may be used in other contexts such as aerospace, marine, and industrial equipment applications.

Figures 1, 2, 5:
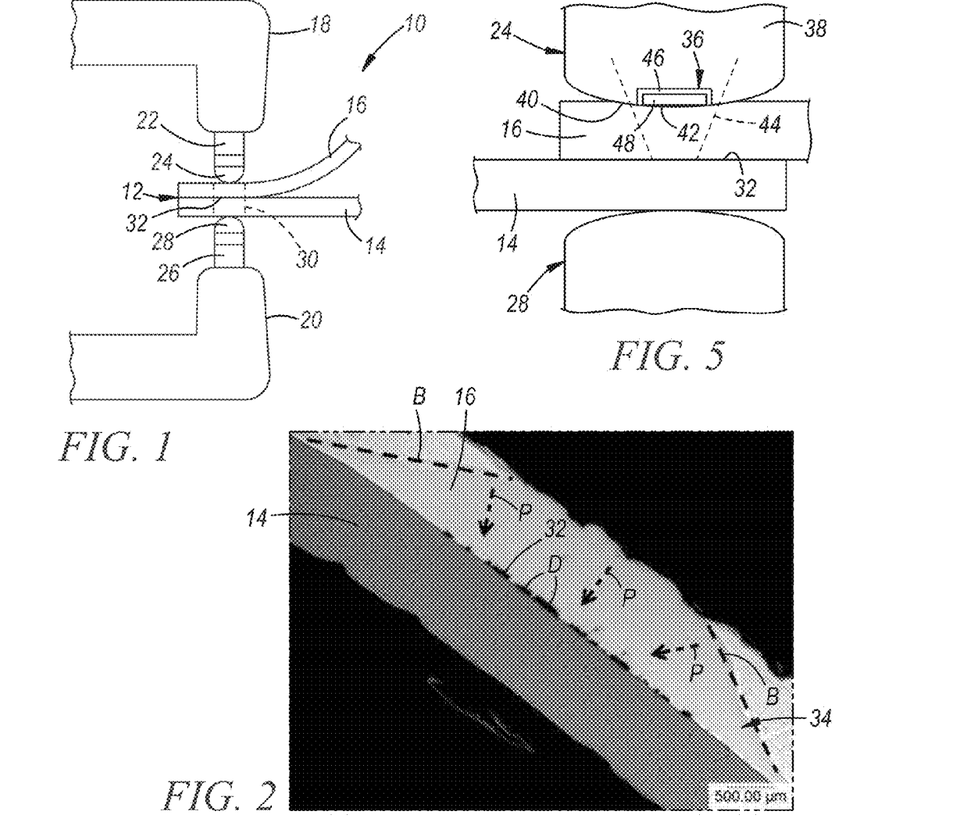
FIG. 1 is a side view of a resistance spot welding assembly.
FIG. 2 is a microstructure of a weld nugget formed by a resistance spot welding process without using an insert like the ones detailed in the description below.
FIG. 5 is a side view of a pair of welding electrodes brought over a workpiece stack-up with one of the welding electrodes having another embodiment of an insert.

FIG. 1 shows one example of a resistance spot welding assembly 10 that can be used to resistance spot weld a workpiece stack-up 12 that includes a steel workpiece 14 and an aluminum workpiece 16 that are overlaid on each other. Although not shown in FIG. 1, the workpiece stack-up 12 could include additional workpieces, if desired, such as a single aluminum workpiece and a pair of steel workpieces to make up a stack-up totaling three individual workpieces, among other possibilities. Each of the steel and aluminum workpieces 14, 16 can have a thickness that ranges between 0.3 mm and 6.0 mm, between 0.5 mm and 4.0 mm, and more narrowly between 0.6 mm and 2.5 mm, although other thickness dimensions are possible. The term "workpiece" and its steel and aluminum variations is used broadly in this description to refer to a sheet metal layer, a casting, an extrusion, or any other piece that is resistance spot weldable.

The steel workpiece 14 can be a galvanized low carbon steel, a galvanized advanced high strength steel (AHSS), an aluminum coated steel, a low carbon steel, a bare steel, or another type of steel. Some more specific kinds of steels that can be used in the steel workpiece 14 include, but are not limited to, interstitial-free (IF) steel, dual-phase (DP) steel, transformation-induced plasticity (TRIP) steel, and press-hardened steel (PHS). The aluminum workpiece 16, on the other hand, can be aluminum, an aluminum-magnesium alloy, an aluminum-silicon alloy, an aluminum-magnesium-silicon alloy, an aluminum-zinc alloy, or another type of aluminum. Some more specific kinds of aluminum alloys that can be used in the aluminum workpiece 16 include, but are not limited to, 5754 aluminum-magnesium alloy, 6022 aluminum-magnesium-silicon alloy, 7003 aluminum-zinc alloy, and Al-10Si-Mg aluminum die casting alloy. In addition, these and other suitable aluminum alloys (as well as aluminum) may be coated with zinc or conversion coatings typically used to improve adhesive bond performance. Optionally, weld-through adhesives or sealers that are normally used in resistance spot welding operations may be present.

Still referring to FIG. 1, the resistance spot welding assembly 10 is typically a part of a larger automated welding operation that includes a first welding gun arm 18 and a second welding gun arm 20 that are mechanically and electrically configured to repeatedly form resistance spot welds. The first welding gun arm 18 can have a first electrode holder 22 that secures a first welding electrode 24, and likewise the second welding gun arm 20 can have a second electrode holder 26 that secures a second welding electrode 28. The first welding electrode 24 is described in more detail below and the second welding electrode 28 can be a conventional electrode composed of a suitable copper alloy material such as, for example, the copper-zirconium alloy that commonly goes by the designation C15000. When engaged in resistance spot welding, the welding gun arms 18, 20 press their respective welding electrodes 24, 28 against opposite sides and outer surfaces of the overlaid workpieces 14, 16 at a weld site 30, with accompanying weld faces of the electrodes aligned across and with each other. A faying interface 32 is located between the steel and aluminum workpieces 14, 16 at confronting and abutting inner surfaces of the workpieces 12, 14. The faying interface 32 encompasses instances of direct contact between the workpiece inner surfaces, as well as instances where the inner surfaces are not in direct contact but are in close proximity to each other that resistance spot welding is possible.

FIG. 2 illustrates a microstructure of an aluminum weld nugget 34 formed by a resistance spot welding process without the use of the first welding electrode 24 described below, but instead with the use of a pair of conventional copper alloy welding electrodes that passed 16 kA of electrical current over 500 ms of weld time. While a suitable weld nugget may be formed in some instances without using the first welding electrode 24 and its insert, in this example defects D have been discovered at, and disseminated along, the faying interface 32. Among other possibilities, the defects D may include shrinkage voids, gas porosity, oxide residue, and micro-cracking. When present and dispersed along the faying interface 32, it has been found that the defects D may reduce the peel strength of the weld joint established between the steel and aluminum workpieces 14, 16 and may negatively impact and weaken the overall integrity of the joint. Moreover, in addition to the defects D, one or more Fe—Al intermetallic layers (not shown), which are also considered to be part of the weld joint along with the aluminum weld nugget 34, may grow between the steel and aluminum workpieces 14, 16 and at the faying interface 32. The Fe—Al intermetallic layers can consist of $FeAl_3$ and $Fe_2Al_5$, as well as other compounds, and when present are often hard and brittle. Again, here, the Fe—Al intermetallic layers can have a negative impact on the overall integrity of the weld joint if allowed to grow extensively.

Without intending to be confined to particular theories of causation, it is currently believed that the accumulation and dissemination of the defects D along the faying interface 32 is due in large part to the solidification behavior of the molten aluminum weld pool as it transitions into the weld nugget 34. That is, a heat imbalance can develop between the much hotter steel workpiece 14 and cooler aluminum workpiece 16 because of the dissimilar physical properties of the two metals—namely, the much greater electrical and thermal resistivities of the steel. The steel therefore acts as a heat source, while the aluminum acts as a heat conductor, meaning the molten aluminum weld pool created within the aluminum workpiece 16 cools and solidifies from its outer perimeter toward the faying interface 32 as heat from the weld pool is extracted directionally through the water-cooled welding electrode in contact with the aluminum workpiece 16. The path and direction of a solidification front is represented generally in FIG. 2 by broken arrows P, and a boundary of the weld nugget 34 is represented generally by broken lines B. The path P is pointed at the faying interface 32 and the more slanted boundary B (compared to that shown in FIG. 4) is the result of solidification toward the faying interface 32. Directed this way, weld pool defects D are drawn or swept towards the faying interface 32 as the solidification front progresses along path P, and may end up situated at and along the faying interface 32. Furthermore, it is currently believed that the growth of the Fe—Al intermetallic layers is due at least in part to the increased temperature experienced by the steel workpiece 14 during the resistance spot welding process.

Figure 3:
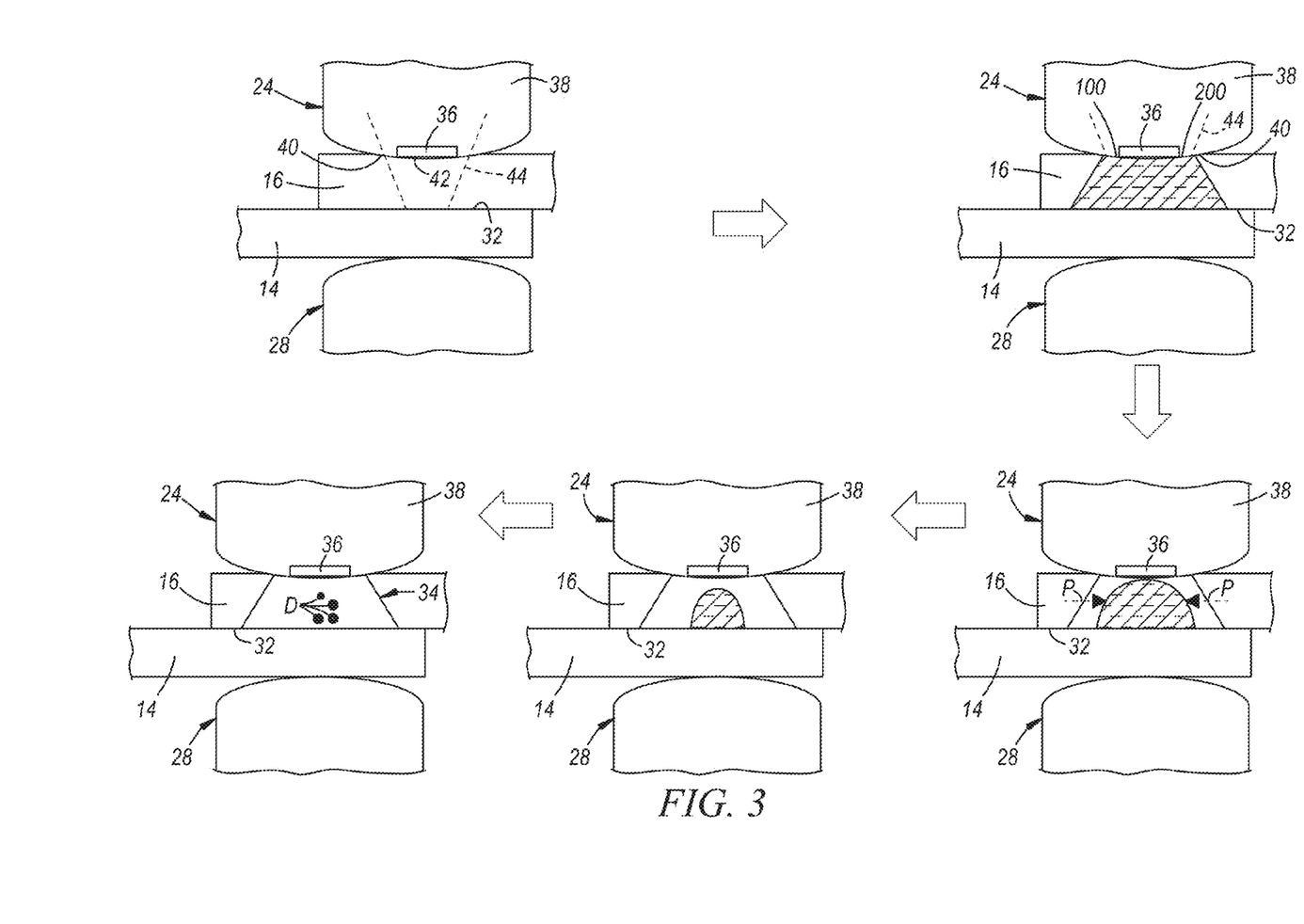
FIG. 3 illustrates a sequence of performing a resistance spot weld and the accompanying solidification behavior of a resulting aluminum weld nugget, the figure showing a side view of a pair of welding electrodes brought over a workpiece stack-up, one of the welding electrodes having an embodiment of an insert.

Referring now to FIG. 3, in order to limit and in some cases altogether preclude the accumulation and dissemination of the defects D at and along the faying interface 32, an insert 36 is embedded within a surrounding body 38 of the first welding electrode 24. The term "insert," as used herein, does not necessarily mean that the component it refers to has to be physically inserted into place during construction of the welding electrode 24; rather, the component can be located in the welding electrode 24 by insertion or by techniques other than insertion. In general, and as described below in greater detail, the insert 36 functions to limit or eliminate heat flux into the surrounding electrode body 38. To accomplish this objective, the insert 36 is constructed to have at least a peripheral portion adjacent to the surrounding electrode body 38 that exhibits an electrical conductivity that is less than or equal to approximately 20% of the electrical conductivity of commercially pure annealed copper as defined by the IACS as well as a thermal conductivity that is less than or equal to approximately 20% of the thermal conductivity of commercially pure annealed copper. The electrical conductivity of commercially pure annealed copper as defined by the IACS (also referred to as 100% IACS) is $5.80 \times 10^7$ S/m. And the thermal conductivity for commercially pure annealed copper is defined herein as 390 W/m° K. The peripheral portion of the insert 36 may be in continuous contact with the surrounding electrode body 38 as shown in FIGS. 3 and 5. In other embodiments, however, the peripheral portion of the insert 36 may be in interrupted by an air gap or gaps.

When constructed to have such a peripheral portion, the insert 36 behaves differently than the surrounding electrode body 38 in terms of electrical and thermal conductivity properties, which is believed to alter the temperature gradients around the molten aluminum weld pool created in the aluminum workpiece 16 during current flow in at least one of two ways. First, because the insert 36 limits or prevents heat flux into the surrounding electrode body 38, any heat contained in the insert 36 is not easily transferred to the electrode body 38 where it can be quickly extracted by the internal cooling mechanism (e.g., water cooling) incorporated into the first welding electrode 24. Heat can be introduced into the insert 36 during current flow by way of conduction from the molten aluminum weld pool and, additionally, it may be generated within the insert 36 if at least part of the insert 36 can conduct electricity. And because such heat cannot easily disperse into the electrode body 38, the insert 36 accumulates and retains heat adjacent to the underlying part of the aluminum workpiece 16, which slows directional heat flow from the molten aluminum weld pool into the first welding electrode 24 and promotes lateral heat transfer within the aluminum workpiece 16.

Second, the insert 36 causes the electrical current being passed between the first and second welding electrodes 24, 28 to assume a conical flow pattern within the aluminum workpiece 16 and around the insert 36. To be sure, as part of the conical flow pattern, the path of the passing electrical current expands radially within the aluminum workpiece 16 such that the electrical current density decreases at least from the faying interface 32 towards the surface of the aluminum workpiece 16 in contact with the first welding electrode 24. The electrical current also passes into the first welding electrode 24 mainly through an annular interface established between the electrode body 38 and the aluminum workpiece 16 around the insert 36. By causing the passage of electrical current in a conical flow pattern, heat becomes concentrated in a smaller zone within the steel workpiece 14 as compared to the aluminum workpiece 16, which has the effect of altering the temperature gradients surrounding the molten aluminum weld pool created in the aluminum workpiece 16, thus promoting lateral heat dissemination from the weld pool into the workpiece stack-up 12.

The exact construction of the insert 36 can depend upon the material of the electrode body 38 and the desired degree of heat retention and conical current dispersion in the aluminum workpiece 16, among other considerations. Similar to the second welding electrode 28, the electrode body 38 can be composed of a copper alloy material having an electrical conductivity of 80% of the electrical conductivity of commercially pure annealed copper as defined by the IACS or greater, such as the copper-zirconium alloy that is commonly identified by the designation C15000, as well as other materials. In one embodiment, as shown here, the insert 36 can be composed entirely of a material exhibiting an electrical conductivity of less than or equal to approximately 20% of the electrical conductivity of commercially pure annealed copper as defined by the IACS and a thermal conductivity of less than or equal to approximately 20% of the thermal conductivity of commercially pure annealed copper. In other words, the insert 36 can be composed entirely of a material that has an electrical conductivity of approximately $1.16 \times 10^7$ S/m or less and a thermal conductivity of approximately 78 W/m° K or less. The insert 36 can even be composed of a material that is considered to be an electric insulator due to its inability to conduct electric current. The material of the insert 36, thus, has a significantly lower electrical conductivity and a significantly lower thermal conductivity than that of the surrounding electrode body 38 as well as the aluminum workpiece 16.

A number of materials can be employed to construct the insert 36 shown in FIG. 3. Some particular examples of materials that can be used when the insert 36 is intended to have some capacity to conduct electrical current (but not more than 20% of the electrical conductivity of commercially pure annealed copper as defined by the IACS) are Fe-based alloys such as low carbon steels, tool steel, and stainless steels. More examples include cupronickel metals, Hastelloy® metals, Inconel® metals, titanium, niobium, tantalum, and vanadium. And when the insert 36 is intended to be a non-conductive electrical insulator, it can be composed of several different ceramic materials. Examples of suitable ceramic materials that can be used include alumina (which has a thermal conductivity of ~30 W/m° K), fused silica (thermal conductivity of ~1.4 W/m° K), cordierite (thermal conductivity of ~1.4 W/m° K), and low and high voltage porcelains (thermal conductivities of ~2 W/m° K).

Still referring to FIG. 3, the insert 36 is embedded in the electrode body 38 so that it forms part of a weld face 40 of the first welding electrode 24. In particular, at the weld face 40, a surface 42 of the insert 36 is exposed to the aluminum workpiece 16 when the first welding electrode 24 is pressed into contact with the workpiece 16. The exposed surface 42 of the insert 36 therefore constitutes a section of the weld face 40. The remaining section of the weld face 40 is made up by a surface of the body 38. The insert 36 may be located at a center of the weld face 40, but does not necessarily have to be, as it is possible for the insert 36 to be somewhat offset from the weld face center. Additionally, although not explicitly shown in FIG. 3, the weld face 40 of the first welding electrode 24, including the exposed surface 42 of the insert 36, may have surface features intended to penetrate the oxide layer(s) formed on the exterior surface of the aluminum workpiece 16. For instance, if desired, the weld face 40 can be textured, roughened, or have a set of protruding rings. Examples of these kinds of surface are described in U.S. Pat. Nos. 6,861,609; 8,222,560; 8,274,010; 8,436,269; and 8,525,066, and in U.S. Patent Application Publication No. 2009/0255908.

The attachment between the electrode body 38 and insert 36 may depend on the materials of the components and should be robust enough to endure an automated welding operation that is typical in automotive and other applications. A variety of ways are available for securing the attachment of the insert 36 in place including an interference fit between the electrode body 38 and the insert 36 or a threaded engagement between the two. However attached, the insert 36 can have a cylindrical and disc shape. And although depicted schematically in sectional profile in FIG. 3, when looking directly at the weld face 40 in plan view, the insert 36 would appear with its circular shape inside the circular shape of the weld face 40. The diameter of the insert 36 is less than the diameter of the weld face 40 by 25% to 80%. The insert 36 can also have a width-to-height aspect ratio of approximately 1:1 in some examples. Other shapes and other geometric aspect ratios are possible in other embodiments.

The method for resistance spot welding the steel and aluminum workpieces 14, 16 together can include more, less, and/or different steps than those described here. In the embodiment presented in FIG. 3, the first and second welding electrodes 24, 28 are pressed against the steel and aluminum workpieces 14, 16 on opposite sides of the stack-up 12 and in opposed alignment with one another. When the first welding electrode 24 is pressed against the aluminum workpiece 16, both the insert 36 and the surrounding body 38 make direct surface-to-surface contact with the aluminum workpiece 16 at the start of electrical current flow between the welding electrodes 24, 28. The insert 36 makes surface-to-surface contact with the aluminum workpiece 16 at an interface—preferably a circular interface—and the electrode body 38 makes surface-to-surface contact with the aluminum workpiece 16 around the insert 36 (e.g., an annular interface when the insert 36 has a circular cross-sectional shape). In the embodiment shown here, the surface-to-surface contact made between the electrode body 38 and the aluminum workpiece 16 occurs at sites 100, 200 in FIG. 3, and spans continuously around the insert 36. Furthermore, the area of surface contact between the surrounding electrode body 38 and the aluminum workpiece 16 can be about 75% to about 2500% of the area of surface contact between the insert 36 and the aluminum workpiece 16.

An electrical current is then exchanged between the first and second welding electrodes 24, 28, and passed through the steel and aluminum workpieces 14, 16 at the weld site 30. Depending on the weld schedule, the electrical current can be a constant DC current ranging between approximately 5 kA and approximately 50 kA or it can be a series of DC current pulses having current peaks ranging between approximately 5 kA and approximately 50 kA. The electrical current may be passed between the first and second welding electrodes 24, 28 over a period of approximately 40 ms to approximately 1,000 ms. When the electrical current passed between the welding electrodes 24, 28 and across the faying interface 32 established between the steel and aluminum workpieces 14, 16, heat is quickly generated within the steel workpiece 14 and at the faying interface 32, resulting in the initiation and growth of a molten aluminum weld pool within the aluminum workpiece 16. The molten aluminum weld pool wets an adjacent surface of the steel workpiece 14 at the faying interface 32 and, upon cessation of the current flow, cools and solidifies into an aluminum weld nugget 34 that forms all or part of a weld joint between the workpieces 14, 16.

The presence of the insert 36 in the first welding electrode 24 is believed to alter the solidification behavior of the molten aluminum weld pool as it transitions into the aluminum weld nugget 34 to limit or altogether preclude the accumulation and dissemination of the defects D at and along the faying interface 32. As described above, the insert 36 accumulates and retains heat adjacent to the underlying part of the aluminum workpiece 16. In the case where the insert 36 is an electrical insulator, the insert 36 is heated by way of heat conduction from the molten aluminum weld pool created within the aluminum workpiece 16. And in the case where the insert 36 is electrically conductive, the insert 36 is heated by way of heat conduction from the molten aluminum weld pool as well as current flow through the insert 36. The extra heat contained within the insert 36 cannot be passed easily to the surrounding electrode body 38 on account of the lower thermal conductivity of the insert 36. Moreover, as also described above, insert 36 also causes the electrical current being passed between the first and second welding electrodes 24, 28 to assume a conical flow pattern within the aluminum workpiece 16, as represented by broken lines 44. The conical flow pattern 44 spreads radially outwardly from the faying interface 32 towards the first welding electrode 24. Its development is due to the higher electrical conductivity of the electrode body 38 at the weld face 40 than that of the exposed surface 42 of the insert 36.

The increased heat (when the insert 36 is constructed of a material exhibiting some ability to conduct electricity), retained heat, and conical flow pattern 44 act together to change the temperature distribution in the weld site 30 by creating three-dimensional radial temperature gradients around the molten aluminum weld pool. These temperature gradients slow directional heat flow into the first welding electrode 24 and help promote lateral heat flow into the aluminum workpiece 16. The resultant improved heat balance and more even heat distribution changes the cooling action of the molten aluminum weld pool as it solidifies to become the weld nugget 34 within the aluminum workpiece 16, as will be described in more detail below with respect to FIG. 4. The extra heat retained in the insert 36 as well as the concentration of heat within a smaller zone in the steel workpiece 14 (a result of the conical flow pattern 44) has another potential benefit: they can reduce the amount of heat that needs to be generated in the steel workpiece 14 by the electrical current to produce the molten aluminum weld pool. The magnitude and/or duration of the electrical current can thus be reduced to try and limit the thickness of any Fe—Al intermetallic layer(s) at faying interface 32.

Figure 4:
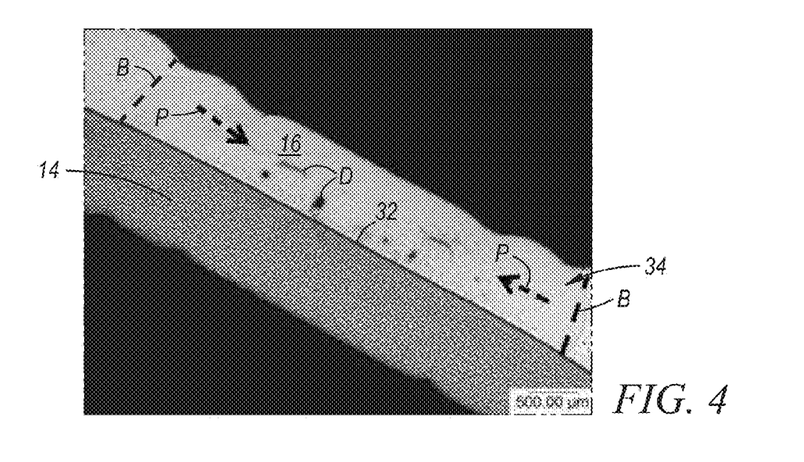
FIG. 4 is a microstructure of a weld nugget formed by a resistance spot welding process using an embodiment of an insert like the ones detailed in the description below.

Referring now to the microstructure of FIG. 4, instead of the solidification front progressing toward the faying interface 32 as is demonstrated in FIG. 2 and described above, the effects of the insert 36 on the temperature gradients around the molten aluminum weld cause the weld pool to cool and solidify inward from its outer perimeter toward a central region. The path and direction of the solidification front is represented generally in FIG. 4 by broken arrows P, and a boundary of the aluminum weld nugget 34 is represented by broken lines B. The path P is pointed toward the central region of the weld nugget 34 and the boundary B is more orthogonal (compared to that shown in FIG. 2) relative to the faying interface 32 as a result of the altered solidification path.

The insert 36 essentially creates a location of elevated temperature within the molten aluminum alloy weld pool that solidifies last, thus allowing gas porosity, shrinkage voids, and other weld defects D to accumulate there. Since weld defects D that are present in the molten aluminum weld pool are swept or drawn toward the central region of the weld pool, and eventually the aluminum weld nugget 34, they are largely situated away from the faying interface 32, as depicted, or mainly at the faying interface 32 within a central location of the weld nugget 34. This cooling and solidification progression is also depicted schematically in FIG. 3 and its arrowed images. The solidification behavior of the molten aluminum weld pool just described and shown in FIGS. 3-4, moreover, can be augmented by keeping the insert 36 in contact with the aluminum workpiece 16 after cessation of the electrical current and while the insert 36 is still hot. As a result of all this, suitable peel strength is maintained and the overall strength and integrity of the established joint between the workpieces 14, 16 is ensured.

Referring now to FIG. 5, another embodiment of the insert 36 is depicted. In this embodiment, the insert 36 includes a casing 46. The casing 46 partially or fully envelopes an interior piece 48 of the insert 36, and serves as an insulating or low electrical/thermal conductivity intermediate barrier between the surrounding electrode body 38 and the interior piece 48. The interior piece 48 can be cylindrical and disc shaped and may have electrical and thermal conductivities below or in excess of 20% of the electrical conductivity (as defined by IACS) and the thermal conductivity of commercially pure annealed copper. And although illustrated schematically in sectional profile in FIG. 5, the casing 46 may have a cup-like shape that surrounds a backside surface and side surfaces of the interior piece 48 of the insert 36 to completely physically isolate the interior piece 48 from the electrode body 38.

The casing 46 exhibits the electrical and thermal conductivity properties and relationships set forth above for the embodiment of FIG. 3. For instance, the casing 46 can be composed of an insulating material or a material having an electrical conductivity less than 20% of the electrical conductivity of commercially pure annealed copper as defined by the IACS and a thermal conductivity less than 20% of the thermal conductivity of commercially pure annealed copper. One example of such a material is Teflon® (PTFE). In another embodiment, the casing 46 can also serve as the attachment between the electrode body 38 and the interior piece 48; for example, the casing 46 can be composed of an adhesive material such as a high-temperature epoxy. The interior piece 48, on the other hand, can have much higher electrical and thermal conductivities since it is isolated from the electrode body 38 by the casing 46, although it does not necessarily have to. Examples of suitable materials for the interior piece 48 of this embodiment include refractory metals such as molybdenum, a molybdenum alloy, tungsten, or a tungsten alloy.

The insert 36 shown in FIG. 5 and just described functions similar to the insert depicted in FIG. 3. As before, when the weld face 40 of the first welding electrode 24 is pressed into contact against the aluminum workpiece 16, the interior piece 48 of the insert 36 as well as the surrounding electrode body 38 make direct surface-to-surface contact with the aluminum workpiece 16 at the weld site 30 at the start of electrical current flow. The interior piece 48 makes surface-to-surface contact with the aluminum workpiece 16 at an interface—preferably a circular interface—and the electrode body 38 makes surface-to-surface contact with the aluminum workpiece 16 around the insert 36 (e.g., an annular interface when the insert 36 has a circular cross-sectional shape). The area of surface contact between the interior piece 48 of the insert 36 and aluminum workpiece 16 may also be greater than the area of surface contact between the electrode body 38 and aluminum workpiece 16. When used in this way, the insert 36 is believed to alter the solidification behavior of the molten aluminum weld pool as it transitions into the aluminum weld nugget 34 to limit or altogether preclude the accumulation and dissemination of the defects D at and along the faying interface 32 in the same general manner as previously described.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding, the method comprising:
providing a workpiece stack-up that includes a steel workpiece and an aluminum or aluminum alloy workpiece;
providing a first welding electrode confronting the aluminum or aluminum alloy workpiece and a second welding electrode confronting the steel workpiece, the first welding electrode having an electrode body and an insert, the insert being embedded within the electrode body such that an exposed surface of the insert and a surface of the electrode body that surrounds the insert together constitute a weld face of the first welding electrode, the insert having at least a peripheral portion adjacent to the surrounding electrode body that has an electrical conductivity less than or equal to approximately 20% of the electrical conductivity of commercially pure annealed copper as defined by the IACS as well as a thermal conductivity that is less than or equal to approximately 20% of the thermal conductivity of commercially pure annealed copper, the second welding electrode being composed of a copper alloy;
bringing the first and second welding electrodes into contact with opposite sides of the workpiece stack-up with the first welding electrode making contact with the aluminum or aluminum alloy workpiece and the second welding electrode making contact with the steel workpiece;
passing an electrical current between the first welding electrode and the second welding electrode to initiate and grow a molten weld pool within the aluminum or aluminum alloy workpiece, wherein both the exposed surface of the insert and the surface of the electrode body that surrounds the insert on the weld face of the first welding electrode make surface-to-surface contact with the aluminum or aluminum alloy workpiece at the start of current flow, and wherein the electrical current flows between the second welding electrode and the surface of the electrode body that surrounds the insert on the weld face of the first welding electrode such that the electrical current assumes a conical flow pattern within the aluminum or aluminum alloy workpiece and a current density of the electrical current decreases towards the first welding electrode; and ceasing the passing of the electrical current between the first welding electrode and the second welding electrode to allow the molten weld pool within the aluminum or aluminum alloy workpiece to solidify into an aluminum weld nugget that forms all or part of a weld joint between the steel and aluminum or aluminum alloy workpieces.

2. The method as set forth in claim 1, wherein the insert is composed entirely of a low carbon steel, a tool steel, a stainless steel, a cupronickel metal, a Hastelloy® metal, an Inconel® metal, titanium, niobium, tantalum, or vanadium.

3. The method as set forth in claim 1, wherein the insert is an electrical insulator.

4. The method as set forth in claim 3, wherein the insert is composed entirely of alumina, fused silica, cordierite, or a porcelain.

5. The method as set forth in claim 1, wherein, when the first and second welding electrodes are brought into contact with opposite sides of the workpiece stack-up, the surface of the electrode body that surrounds the insert and forms part of the weld face has an area of surface contact with the aluminum or aluminum alloy workpiece that is 75% to 2500% of an area of surface contact between the exposed surface of the insert and the aluminum or aluminum alloy workpiece.

6. The method as set forth in claim 1, wherein the electrical current also flows between the second welding electrode and the exposed surface of the insert to generate heat within the insert.

7. The method as set forth in claim 1, wherein the insert includes a casing and an interior piece, the casing at least partially or fully enveloping the interior piece to physically isolate the interior piece from the electrode body, and wherein the casing has an electrical conductivity that is less than or equal to approximately 20% of the electrical conductivity of commercially pure annealed copper as defined by the IACS as well as a thermal conductivity that is less than or equal to approximately 20% of the thermal conductivity of commercially pure annealed copper.

8. The method as set forth in claim 7, wherein the casing is an adhesive material that also attaches the interior piece to the surrounding electrode body.

9. The method as set forth in claim 7, wherein the casing is composed of PTFE.

10. A method of resistance spot welding, the method comprising:
providing a workpiece stack-up that includes a steel workpiece and an aluminum or aluminum alloy workpiece;
bringing a weld face of a first welding electrode into contact with the aluminum or aluminum alloy workpiece, the first welding electrode having an electrode body and an insert, the insert being embedded within the electrode body such that an exposed surface of the insert and a surface of the electrode body that surrounds the insert together constitute the weld face of the first welding electrode, the insert having a peripheral portion adjacent to the surrounding electrode body that has an electrical conductivity less than or equal to 20% of the electrical conductivity of commercially pure annealed copper as defined by the IACS as well as a thermal conductivity that is less than or equal to 20% of the thermal conductivity of commercially pure annealed copper;
bringing a second welding electrode into contact with the steel workpiece in alignment with the first welding electrode, the second welding electrode being composed of a copper alloy that has an electrical conductivity of 80% of the electrical conductivity of commercially pure annealed copper as defined by the IACS or greater;

passing an electrical current between the first welding electrode and the second welding electrode to initiate and grow a molten weld pool within the aluminum or aluminum alloy workpiece, wherein both the exposed surface of the insert and the surface of the electrode body that surrounds the insert on the weld face of the first welding electrode make surface-to-surface contact with the aluminum or aluminum alloy workpiece at the start of current flow between the first and second welding electrodes, and wherein the electrical current flows between the second welding electrode and the surface of the electrode body that surrounds the insert on the weld face of the first welding electrode such that the electrical current assumes a conical flow pattern within the aluminum or aluminum alloy workpiece and a current density of the electrical current decreases towards the first welding electrode; and ceasing the passing of the electrical current between the first welding electrode and the second welding electrode to allow the molten weld pool within the aluminum or aluminum alloy workpiece to solidify into an aluminum weld nugget that forms all or part of a weld joint between the steel and aluminum or aluminum alloy workpieces.

11. The method as set forth in claim 10, wherein the insert is composed entirely of a material that has an electrical conductivity less than or equal to approximately 20% of the electrical conductivity of commercially pure annealed copper as defined by the IACS as well as a thermal conductivity that is less than or equal to approximately 20% of the thermal conductivity of commercially pure annealed copper.

12. The method as set forth in claim 11, wherein the insert is composed entirely of a low carbon steel, a tool steel, a stainless steel, a cupronickel metal, a Hastelloy® metal, an Inconel® metal, titanium, niobium, tantalum, or vanadium.

13. The method as set forth in claim 10, wherein the insert is an electrical insulator.

14. The method as set forth in claim 13, wherein the insert is composed entirely of alumina, fused silica, cordierite, or a porcelain.

15. The method as set forth in claim 10, wherein the insert includes an interior piece and a casing that partially or fully envelopes the interior piece to physically isolate the interior piece from the electrode body, the casing having an electrical conductivity that is less than or equal to approximately 20% of the electrical conductivity of commercially pure annealed copper as defined by the IACS as well as a thermal conductivity that is less than or equal to approximately 20% of the thermal conductivity of commercially pure annealed copper.

16. The method as set forth in claim 15, wherein the interior piece has an electrical conductivity in excess of 20% of the electrical conductivity of commercially pure annealed copper as defined by the IACS as well as a thermal conductivity in excess of 20% of the thermal conductivity of commercially pure annealed copper.

17. The method as set forth in claim 16, wherein the interior piece of the insert is composed of molybdenum, a molybdenum alloy, tungsten, or a tungsten alloy.

18. The method as set forth in claim 16, wherein the casing of the insert is composed of an epoxy adhesive or PTFE.

19. The method as set forth in claim 10, wherein the weld face of the first welding electrode has a diameter, and wherein a diameter of the exposed surface of the insert is less than the diameter of the weld face, and wherein, when the first and second welding electrodes are brought into contact with the aluminum or aluminum alloy workpiece and the steel workpiece, respectively, the surface of the electrode body that surrounds the insert and forms part of the weld face has an area of surface contact with the aluminum or aluminum alloy workpiece that is 75% to 2500% of an area of surface contact between the exposed surface of the insert and the aluminum or aluminum alloy workpiece.

20. The method as set forth in claim 10, wherein the electrical current also flows between the second welding electrode and the exposed surface of the insert to generate heat within the insert.

* * * * *